United States Patent
Lee et al.

(10) Patent No.: US 7,341,641 B2
(45) Date of Patent: Mar. 11, 2008

(54) BONDING DEVICE FOR MANUFACTURING LIQUID CRYSTAL DISPLAY DEVICE

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/259,517

(22) Filed: Sep. 30, 2002

(65) Prior Publication Data

US 2003/0178467 A1 Sep. 25, 2003

(30) Foreign Application Priority Data

Mar. 20, 2002 (KR) .................. 10-2002-0015078
Mar. 22, 2002 (KR) .................. 10-2002-0015642

(51) Int. Cl.
*B32B 37/10* (2006.01)
*B23K 31/02* (2006.01)

(52) U.S. Cl. .................. 156/273.1; 156/285; 228/199; 228/221

(58) Field of Classification Search .................. 228/42, 228/219, 205, 203, 212, 213, 214, 44.3, 44.7; 118/725, 728
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,263,888 A | 11/1993 | Ishihara et al. |
| 5,331,987 A * | 7/1994 | Hayashi et al. .......... 134/102.1 |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,539,545 A | 7/1996 | Shimizu et al. |
| 5,548,429 A | 8/1996 | Tsujita |
| 5,680,189 A | 10/1997 | Shimizu et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,909,264 A * | 6/1999 | Fujikawa et al. ............. 349/49 |
| 5,952,676 A | 9/1999 | Sato et al. |
| 5,952,678 A | 9/1999 | Ashida |
| 5,956,112 A | 9/1999 | Fujimori et al. |
| 5,970,717 A * | 10/1999 | Tateyama ..................... 62/3.2 |
| 6,001,203 A | 12/1999 | Yamada et al. |
| 6,016,181 A | 1/2000 | Shimada |

(Continued)

FOREIGN PATENT DOCUMENTS

EP 1003066 5/2000

(Continued)

*Primary Examiner*—Kiley Stoner
(74) *Attorney, Agent, or Firm*—McKenna Long & Aldridge LLP

(57) ABSTRACT

A bonding device for manufacturing a liquid crystal display device includes a bonding chamber for bonding first and second substrates and an ionizing device for introducing ionized gas or air into the bonding chamber.

9 Claims, 9 Drawing Sheets

U.S. PATENT DOCUMENTS

| | | | |
|---|---|---|---|
| 6,129,546 A * | 10/2000 | Sada | 432/253 |
| 6,219,126 B1 | 4/2001 | Von Gutfeld | |
| 6,222,603 B1 | 4/2001 | Sakai et al. | |
| 6,236,445 B1 | 5/2001 | Foschaar et al. | |
| 6,304,311 B1 | 10/2001 | Egami et al. | |
| 6,337,730 B1 | 1/2002 | Ozaki et al. | |
| 2001/0021000 A1 | 9/2001 | Egami | |

FOREIGN PATENT DOCUMENTS

| | | |
|---|---|---|
| JP | 51-065656 | 7/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | S62-054225 | 3/1987 |
| JP | S62-054228 | 3/1987 |
| JP | S62-054229 | 3/1987 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | H06-018829 | 1/1994 |
| JP | 06051256 | 2/1994 |
| JP | H06-064229 | 3/1994 |
| JP | 06148657 | 5/1994 |
| JP | 6160871 | 6/1994 |
| JP | H06-194637 | 7/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | H07-275770 | 10/1995 |
| JP | H07-275771 | 10/1995 |
| JP | H08-076133 | 3/1996 |
| JP | 08-101395 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08171094 | 7/1996 |
| JP | 08190099 | 7/1996 |
| JP | H08-173874 | 7/1996 |
| JP | 08240807 | 9/1996 |
| JP | 09005762 | 1/1997 |
| JP | 09026578 | 1/1997 |
| JP | H09-001026 | 1/1997 |
| JP | 09-061829 | 3/1997 |
| JP | 09073075 | 3/1997 |
| JP | 09073096 | 3/1997 |
| JP | H09-094500 | 4/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | H10-174924 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-066218 | 3/2000 |
| JP | 2002-080321 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-267106 * | 9/2000 |
| JP | 2000-284295 | 10/2000 |
| JP | 2000-292799 | 10/2000 |
| JP | 2000-305059 | 11/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117109 | 4/2001 |
| JP | 2001117105 | 4/2001 |
| JP | 2001-133745 | 5/2001 |
| JP | 2001-133799 | 5/2001 |
| JP | 2001133794 | 5/2001 |
| JP | 2001142074 | 5/2001 |
| JP | 2001147437 | 5/2001 |
| JP | 2001-166272 | 6/2001 |
| JP | 2001-166310 | 6/2001 |
| JP | 2001154211 | 6/2001 |
| JP | 2001-183683 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |

| | | |
|---|---|---|
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002-079160 | 3/2002 |
| JP | 2002082340 | 3/2002 |
| JP | 2002090759 | 3/2002 |
| JP | 2002090760 | 3/2002 |
| JP | 2002-122870 | 4/2002 |
| JP | 2002107740 | 4/2002 |
| JP | 2002122872 | 4/2002 |
| JP | 2002122873 | 4/2002 |
| JP | 2002-131762 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002080321 | 6/2002 |
| JP | 2002202512 | 7/2002 |
| JP | 2002202514 | 7/2002 |
| JP | 2002214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| KR | 2000-035302 A1 | 6/2000 |

* cited by examiner

BONDING DEVICE FOR MANUFACTURING LIQUID CRYSTAL DISPLAY DEVICE

This application claims the benefit of Korean Patent Application Nos. P2002-15078 filed on Mar. 20, 2002, and P2002-15642 filed on Mar. 22, 2002, which are hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a bonding device for manufacturing a liquid crystal display device, and more particularly, to a bonding device for manufacturing a liquid crystal display device with an ionizing device.

2. Discussion of the Related Art

In general, recent developments in the information communication field have increased demand for various types of displays devices. In response to this demand, various flat panel type displays such as liquid crystal display (LCD), plasma display panel (PDP), electro-luminescent display (ELD), and vacuum fluorescent display (VFD) have been developed. These are used as displays for various equipments.

In particular, LCD devices have been used because of their high resolution, lightweight, thin profile, and low power consumption. In addition, LCD devices have been implemented in mobile devices such as monitors for notebook computers. Furthermore, LCD devices have been developed for monitors of computer and television to receive and display image signals.

Efforts to improve the image quality of LCD devices contrast with the benefits of high resolution, lightweight, thin profile, and low power consumption. In order to incorporate LCD devices as a general image display, image quality such as fineness, brightness and large display area, for example, must be realized.

The process of manufacturing an LCD device in a related art includes forming a sealant pattern on one of the first and second substrates to form an injection inlet, bonding the first and second substrates to each other within a vacuum processing chamber, and injecting liquid crystal material through the injection inlet. In another process of manufacturing an LCD device according to the related art, a liquid crystal dropping method, which is disclosed in Japanese Patent Application No. 11-089612 and 11-172903, includes dropping liquid crystal material on a first substrate, arranging a second substrate over the first substrate, and moving the first and second substrates to be adjacent to each other, and bonding the first and second substrates to each other.

Compared to the liquid crystal injection method, the liquid crystal dropping method is advantageous in that various processes such as, formation of a liquid crystal material injection inlet, injection of the liquid crystal material, and sealing of the injection inlet are unnecessary since the liquid crystal material is predisposed on the first substrate. To this end, a variety of apparatuses for applying the liquid crystal dropping method have been recently researched.

FIGS. 1 and 2 show cross sectional views of a substrate assembly device using the liquid crystal dropping method according to the related art. In FIG. 1, the substrate assembly device includes a frame 10, an upper stage 21, a lower stage 22, a sealant dispenser (not shown), a liquid crystal material dispenser 30, a processing chamber including an upper chamber unit 31 and a lower chamber unit 32, a chamber moving system 40, and a stage moving system 50. The chamber moving system 40 includes a driving motor driven to selectively move the lower chamber unit 32 to a location where the bonding process is carried out, or to a location where the outflow of the sealant and dropping of the liquid crystal material occur. The stage moving system 50 includes another driving motor driven to selectively move the upper stage 21 along a vertical direction perpendicular to the upper and lower stages 21 and 22.

A process of manufacturing a liquid crystal display device using the substrate assembly device of FIGS. 1 and 2 is explained. First, a second substrate 52 is loaded on the upper stage 21, and a first substrate 51 is loaded upon the lower stage 22. Then, the lower chamber unit 32 having the lower stage 22 is moved to a processing location by the chamber moving system 40 for sealant dispensing and liquid crystal material dispensing. Subsequently, the lower chamber unit 32 is moved to a processing location for substrate bonding by the chamber moving system 40. Thereafter, the upper and lower chamber units 31 and 32 are assembled together by the chamber moving system 40 to form a vacuum tight seal, and pressure in the chamber is reduced by a vacuum generating system.

Then, the upper stage 21 is moved downwardly by the stage moving system 50 at the above-mentioned vacuum state so as to closely contact the second substrate 52 fixed to the upper stage 21 to the first substrate 51 fixed to the lower stage 22. Further, the process of bonding the respective substrates to each other is carried out through a continuous pressurization, thereby completing the manufacture of the LCD device. Thus, after the bonding of the substrates is completed, the upper and lower chamber units 31 and 32 are separated from each other, and the lower chamber unit 32 is moved to an unloading position by the chamber moving system 40, and the bonded substrates are unloaded.

However, the substrate assembly device according to the related art is problematic. First, when upper and lower stages are pressed to bond the two substrates to each other, glass substrates may break due to excessive pressure and equipment error. An operator will remove the broken glass pieces but such broken glass pieces may not be easily and completely eliminated thus reducing an adhesive strength of a sealant and degrading liquid crystal property. Second, while the process of loading and unloading the substrates is repeated, particles on the substrates remain inside the chamber, which degrades bonding. Third, static electricity may occur to damage inner circuits of the liquid crystal display device.

SUMMARY OF THE INVENTION

Accordingly, the present invention is directed to a bonding device for manufacturing a liquid crystal display device that substantially obviates one or more of the problems due to limitations and disadvantages of the related art.

An advantage of the present invention is to provide a bonding device for manufacturing an LCD device, suitable for manufacturing a large-sized LCD device and having an optimum size for an efficient layout.

Another advantage of the present invention is to provide a bonding device for manufacturing an LCD device, in which an efficient manufacturing process is realized by reducing a processing time for manufacturing an LCD panel and by simplifying the movement and movement direction of stages to efficiently align substrates.

Another advantage of the present invention is to provide a bonding device for manufacturing an LCD device with an ionizing device for preventing static electricity which may be generated during the process of loading and unloading the substrates.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a bonding device for manufacturing an LCD device of the present invention includes a bonding chamber for bonding first and second substrates and an ionizing device for ionizing air or gases which flow into the bonding chamber.

Preferably, the ionizing device is movably located in front of an opening of the bonding chamber. The bonding device further includes a cylinder fixed to a base of the bonding device and an elevating axis for elevating the ionizing device as the cylinder is driven. The ionizing device and the elevating axis are coupled to each other such that the ionizing device is rotatable. The ionizing device includes a plurality of holes formed on one side of a sealed pipe, a plurality of ion generating tips formed in front of the holes of the sealed pipe for generating the ion, and a supply pipe for providing air or gases to the sealed pipe. The ionizing device includes first and second ionizing devices movably formed on upper and lower parts, in front of an opening of the bonding device.

Preferably, the bonding device further includes a first cylinder fixed to the base of the bonding device, a first elevating axis for elevating a first ionizing device as the first cylinder is driven, a second cylinder fixed to an upper frame of the bonding device, and a second elevating axis for elevating a second ionizing device as the second cylinder is driven. The first and second ionizing devices and the first and second elevating axes are respectively coupled such that the first and second ionizing devices are rotatable. The first and second ionizing devices include a plurality of holes formed on one side of a sealed pipe, a plurality of ion generating tips formed in front of the holes for generating an ion, and a supply pipe for providing air or gases to the sealed pipe.

In another aspect of the present invention, a bonding device for a liquid crystal display device includes a bonding chamber for bonding first and second substrates, a vent pipe for venting the bonding chamber, and an ionizing device formed on the vent pipe for ionizing air or gases which flow into the bonding chamber through the vent pipe.

Preferably, the ionizing device includes an ion generating pipe connected to the vent pipe, and a plurality of ion generating tips formed inside the ion generating pipe for generating an ion. The ionizing device is formed on each of a plurality of vent pipes. The ionizing device is selectively formed on one or more of a plurality of vent pipes.

In another aspect of the present invention, a bonding device for a liquid crystal display device includes a bonding chamber for bonding first and second substrates, a vent hole for venting the bonding chamber, and an ionizing device formed inside the bonding chamber adjacent the vent hole for ionizing air or gases which flow into the bonding chamber through the vent hole.

Preferably, the ionizing device includes a supporting means fixed inside the bonding chamber adjacent the vent hole and a plurality of ion generating tips formed on the supporting means for generating ion. The ionizing device is provided inside the bonding chamber adjacent a plurality of vent holes. One or more ionizing devices are selectively formed inside the bonding chamber adjacent the plurality of vent holes. The ionizing device is rotatably formed inside the bonding device adjacent the vent holes.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
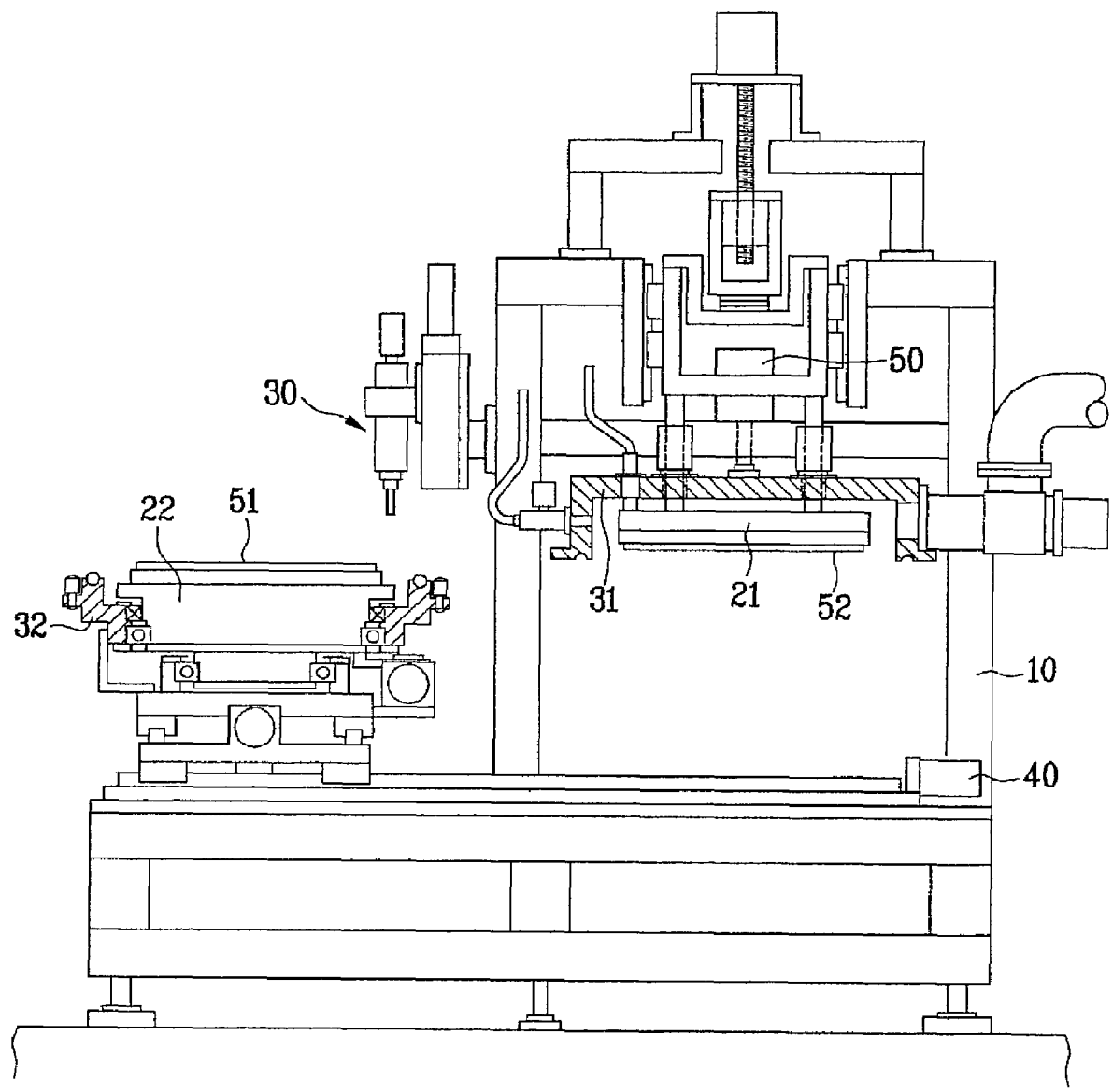
FIG. 1 is a schematic diagram illustrating a substrate assembly device based on a liquid crystal dropping type of the related art at the liquid crystal dropping stage.
Figure 2:
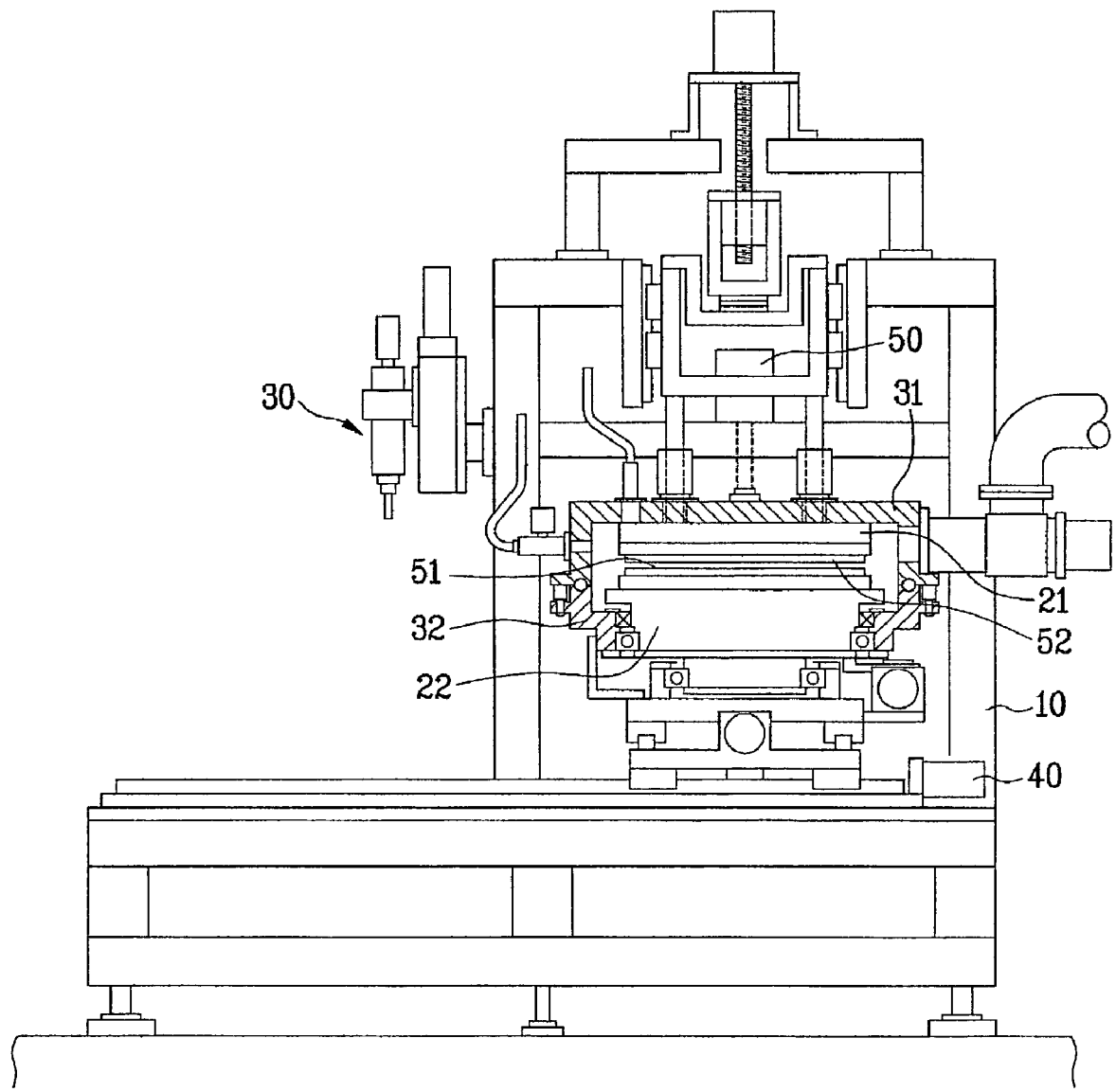
FIG. 2 is a schematic diagram illustrating a substrate assembly device based on a liquid crystal dropping type of the related art at the substrate bonding stage.
Figure 3:
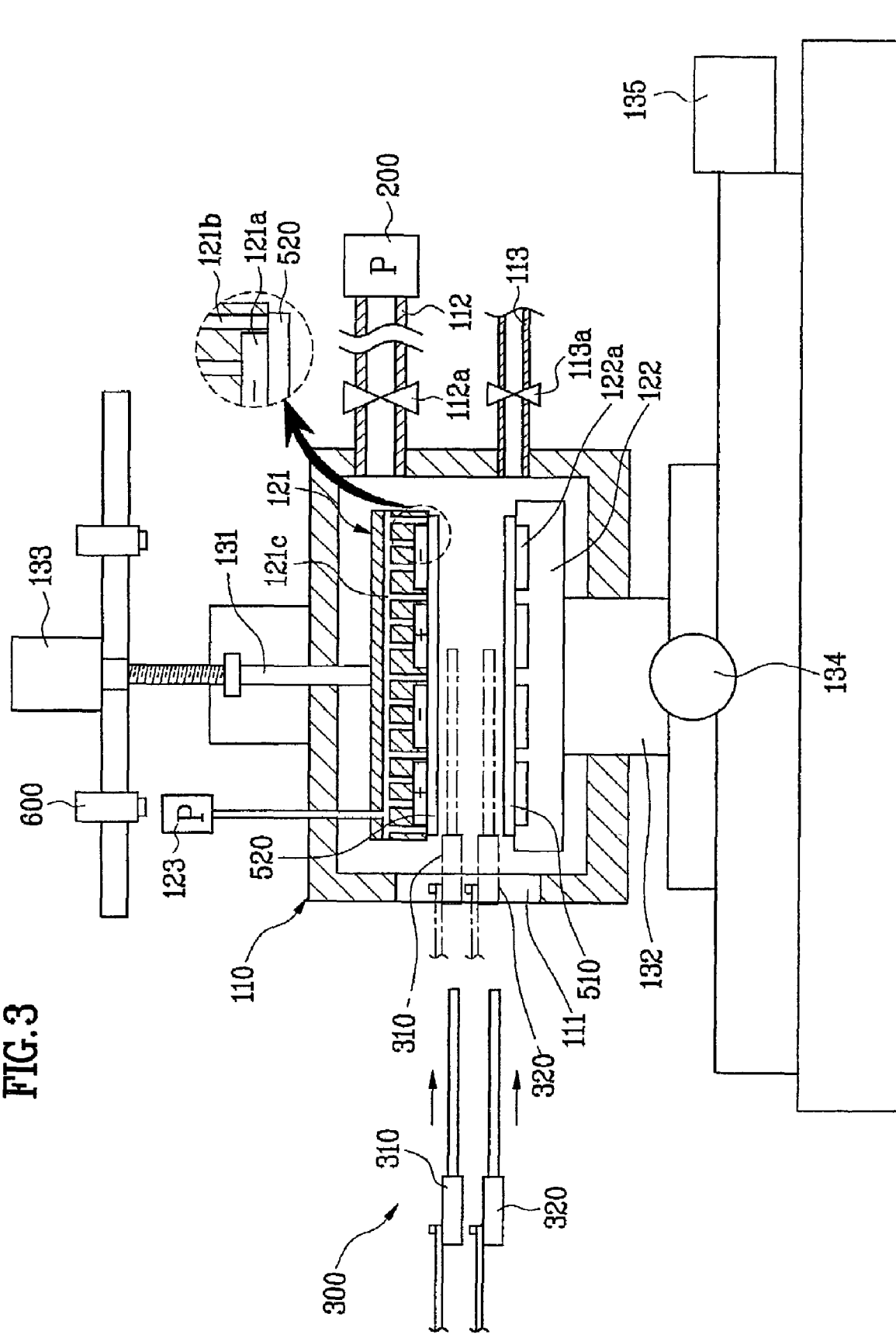
FIG. 3 is a simplified schematic diagram illustrating a bonding device for manufacturing an LCD device based on a liquid crystal dropping type in accordance with the present invention.

FIG. 3 is a simplified schematic diagram illustrating a bonding device for manufacturing an LCD device based on a liquid crystal dropping or applying type in accordance with the present invention.

Referring to FIG. 3, a bonding device of the present invention for manufacturing a liquid crystal display device includes a bonding chamber 110, upper stage 121, lower stage 122, stage moving devices 131 and 132, vacuum device including suction pump 200, pipe 112 and valve 112a, venting device including vent pipe 113 and valve 113a, and a loader 300. The bonding chamber 110 selectively becomes a vacuum state or an atmospheric state to bond substrates by pressurizing them and by using a pressure difference in order. An opening 111 is formed at a predetermined part of the circumference of the bonding chamber 110 for receiving or removing each substrate.

An air discharge pipe 112 and a vent pipe 113 are connected to one side of the bonding chamber 110. The air discharge pipe 112 discharges existing air in the bonding chamber by a suction force from a vacuum device. The vent pipe 113 maintains the inside of the bonding chamber at an atmospheric state by having air or gases ($N_2$) flow into the bonding chamber 110. In this way, the bonding chamber selectively becomes and recovers from the vacuum state. Although only one air discharge pipe 112 and one vent pipe is shown in FIG. 3, a plurality of air discharge pipes 112 and vent pipes may be formed. Valves 112a and 113a electronically controlled for selectively opening and closing the path of the pipes are formed on the air discharge pipe 112 and vent pipe 113, respectively.

At an opening 111 of the bonding chamber 110, a door (not shown) is additionally formed to selectively open or close the opening 111. The door may be a sliding door or a revolving door. Other suitable constructions for the door can be used. When the sliding door or the revolving door is used, a sealant for sealing gaps is preferably provided.

Upper and lower stages facing each other are formed respectively on the upper and lower parts inside the bonding chamber 110. The first and second substrates 510 and 520 brought into the bonding chamber by a loader 300 are fixed to the upper and lower stages 121 and 122 and placed in proper positions in the bonding chamber.

On the upper and lower stages 121 and 122, one or more electric static chucks (ESC) 121a and 122a are provided to fix the substrates using an electrostatic force. Also, one or more vacuum holes 121b are formed on the upper and lower stages to hold and bond the substrates using vacuum force.

The electric static chucks 121a and 122a include a plurality of pairs of flat electrodes, to which direct current power having different polarity is provided for an electrostatic bonding of the substrates. Alternatively, one electric static chuck 121a having both polarities can be used to provide the electrostatic force.

The plurality of vacuum holes 121b are formed along the circumference of each of the electric static chucks 121a provided at the bottom of the upper stage 121. The respective vacuum holes 121b communicate with each other through a plurality of paths 121c. A vacuum force is generated by a vacuum pump 123.

On one side of the lower stage 122, one or more electrostatic chucks 122a are provided to hold the substrates onto the stage by electrostatic force and one or more vacuum holes (not shown) are formed to hold the substrates on the stage by vacuum force.

The stage moving system of the present invention includes an upper moving axis 131, a lower moving axis 132, and driving motors 133 and 134. The moving axis 131 is driven to selectively move the upper stage 121 up and down. The rotating axis 132 is driven to selectively move the lower stage 122 in a lateral direction. The driving motors 133 and 134 for selectively driving the respective axes extend from outside the bonding chamber to the inside of the bonding chamber and coupled to the respective stages 121 and 122.

A driver 135 moves the lower stage 122 laterally when the substrates are being aligned.

The vacuum device delivers a suction force to place the bonding chamber 110 in a vacuum state. For this reason, the vacuum device has a suction pump 200 which is driven to generate an air suction force. The suction pump 200 is formed to communicate with the air discharge pipe 112 of the bonding chamber 110.

The loader is separately provided outside the bonding chamber 110 unlike other components provided inside the bonding chamber 110. The loader loads and unloads the first substrate 510 on which liquid crystal is applied and the second substrate 520 on which a sealant is applied in and out of the bonding chamber 110.

The loader has a first arm 310 for conveying the first substrate 510 with the liquid crystal and a second arm 320 for conveying the second substrate 520 with the sealant. Before the substrates 510 and 520 on the arms 310 and 320 are transferred to the inside of the bonding chamber 110, the first arm 310 is positioned higher than the second arm 320.

The first arm 310 is positioned higher than the second arm 320 to prevent various kinds of foreign particles from being dropped onto the liquid crystal applied on the first substrate 510. In other words, if the second arm 320 is positioned higher than the first arm 310, various kinds of foreign particles may be dropped onto the liquid crystal of the first substrate 510 as the second arm 320 moves.

The first arm 310 does not necessarily transfer only the first substrate 510 with the liquid crystal and the second arm 320 does not necessarily transfer only the second substrate 520 with the sealant. Preferably, however, the first arm 310 conveys only the substrate with the liquid crystal and the second arm 320 conveys only the substrate with the sealant. Alternatively, if one substrate is provided with both the liquid crystal and the sealant, the first arm 310 may convey this substrate and the second arm 320 may convey the other substrate.

The bonding device of the present invention further includes an alignment device 600 for checking the alignment status of the substrates 510 and 520 brought into the bonding chamber 110 to be loaded onto the stages 121 and 122 by the loader. The alignment device 600 may be provided inside or outside the bonding chamber 110. In explaining the alignment device, however, the alignment device 600 is shown to be outside of the bonding chamber 110.

The substrate bonding process using a bonding system of the present invention will be described below.

A first substrate with a liquid crystal and a second substrate with a sealant are provided. The first substrate may be provided with both the liquid crystal and the sealant. As shown in a dotted line in FIG. 3, a loader 300 has the first substrate 510 on a stand-by position at the upper side using a first arm 310. The loader 300 places the second substrate 520 with its surface with the sealant facing down below the first arm 310 using a second arm 320.

When an opening 111 of the bonding chamber 110 is opened, the loader 300 controls the second arm 320 to load the second substrate 520 inside the bonding chamber 110 through the opening 111 with the sealant facing down. An upper stage 121 is placed on the upper side of the second substrate 520. A vacuum pump 123 coupled to the upper stage 121 delivers a vacuum force to vacuum holes 121*b* formed on the upper stage 121 so that the upper stage 121 holds and fixes the second substrate 520 brought in by the second arm 320. Then, the upper stage 121 with the second substrate 520 ascends.

The loader controls the first arm 310 so that the first substrate 510 with the liquid crystal is loaded into the bonding chamber 110 and onto the lower stage 122. Similarly to the upper stage 121, a vacuum pump (not shown) connected to the lower stage 122 delivers a vacuum force to vacuum holes (not shown) formed on the lower stage 122 to hold and fix the first substrate 510 brought in by the first arm 310. In this way, the first substrate 510 is attached to the lower stage 122.

The second substrate 520 with the sealant is preferably brought in before the first substrate 510 with the liquid crystal. Otherwise, dust which may be generated while the second substrate 520 is being brought in may be undesirably dropped on the liquid crystal of the first substrate 510.

Since the bonded substrates are already provided on the lower stage from completing the bonding process, the second arm 320 unloads the bonded substrates on the lower stage after bringing in the next second substrate for the next bonding process. In this way, the processes of loading and unloading are performed efficiently, thereby reducing the processing time.

When the loading process of the respective substrates 510 and 520 is completed, the arms 310 and 320 of the loader 300 exit the bonding chamber 110. Also, the door of the opening 111 of the bonding chamber 110 closes to seal the bonding chamber 110, as shown in FIG. 3.

Then, although not shown in FIG. 3, a substrate receiver is placed under the upper stage and the second substrate is placed on the substrate receiver from the upper stage. The bonding chamber then becomes a vacuum state. In other words, a suction pump (vacuum device) 200 is driven to generate a suction force which is delivered into the bonding chamber 110 through valve 112*a* in the air discharge pipe 112. Therefore, the bonding chamber 110 goes under vacuum.

When the bonding chamber 110 is in the vacuum state, the suction pump 200 stops and the valve 112*a* operates to keep the air discharge pipe 112 closed. Also, the upper and lower stages 121 and 122 activate their respective electro static chucks 121*a* and 122*a* to hold and fix the substrates 510 and 520. Then, the substrate receiver, which temporarily held the second substrate 520, is replaced to its original position.

In this state, a stage moving system drives a driving motor 133 to move the upper stage 121 downward to near the lower stage 122. The alignment device 600 checks the alignment status of the substrates 510 and 520 bonded to the respective stages 122 and 121 and also provides a control signal to moving axes 131 and 132 to align the substrates.

The stage moving device moves the second substrate 520 on the upper stage 121 to the first substrate 510 on the lower stage 520 to bond them together by pressing them. In this way, the first bonding process is performed. The first bonding process in which the substrates are bonded by pressing of the stages 121 and 122 does not necessarily complete the bonding process. In this process, the substrates are preferably bonded such that air cannot flow into the space or interval between the substrates when the bonding chamber returns to the atmospheric state.

When the first bonding process is completed, the valve 113*a* operates to open the vent pipe 113 so that dry air or $N_2$ gas can flow into the bonding chamber 110. Accordingly, the bonding chamber 110 returns to the atmospheric state and the bonded substrates are pressed together by an atmospheric pressure difference. That is, because the inside of the bonding chamber is at the atmospheric state while the interval between the first and second substrates sealed by the sealant is in the vacuum state, the substrates are pressed to each other by a constant pressure. In this way, the substrates are bonded more completely. After the bonding process, the door at the opening 111 of the bonding chamber 110 is driven to open.

Then, the loader 300 performs the unloading process of the bonded substrates and repeats the above-described processes to bond the next substrates.

Because the bonding device of the present invention uses the ESC method to hold the substrates, static electricity may occur when the substrates are loaded and unloaded. To prevent static electricity, an ionizing method may be applied.

Figure 4:
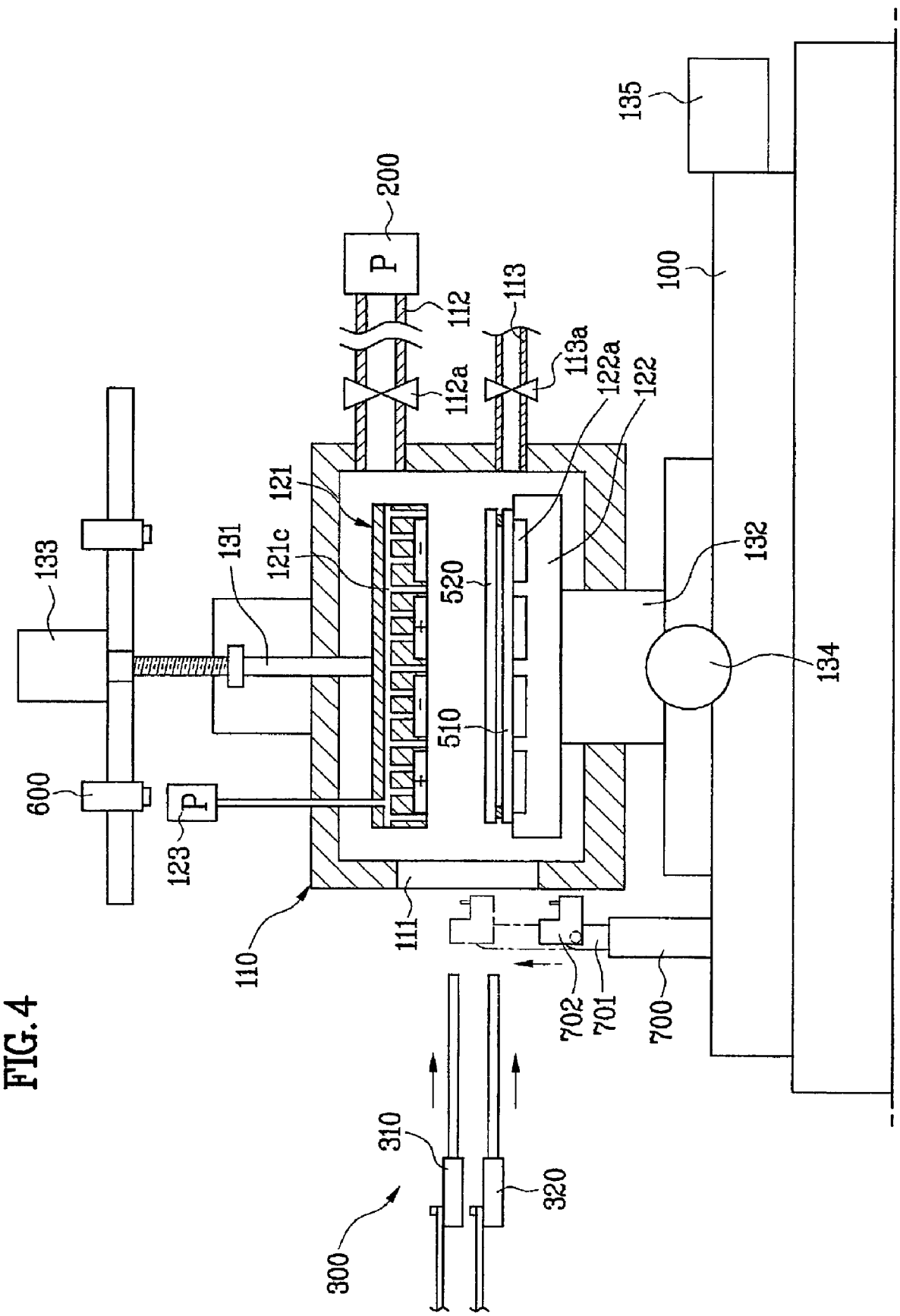
FIG. 4 is a simplified schematic diagram illustrating an ionizing device of a bonding chamber in accordance with the first embodiment of the present invention.

FIG. 4 is a simplified schematic diagram of an ionizing device for a bonding device in accordance with the first embodiment of the present invention.

As shown in FIG. 4, the ionizing device of the first embodiment of the present invention includes a cylinder 700 and an ionizing device 702. The cylinder 700 for elevating the ionizing device 702 is placed in front of an opening 111 of the bonding chamber 110 and is preferably fixed to a base 100 of the bonding device. The ionizing device 702 is rotatably formed on an elevating axis 701 which moves up and down by the operation of the cylinder 700. This eliminates residue static electricity at the lower stage 122.

Figure 5:
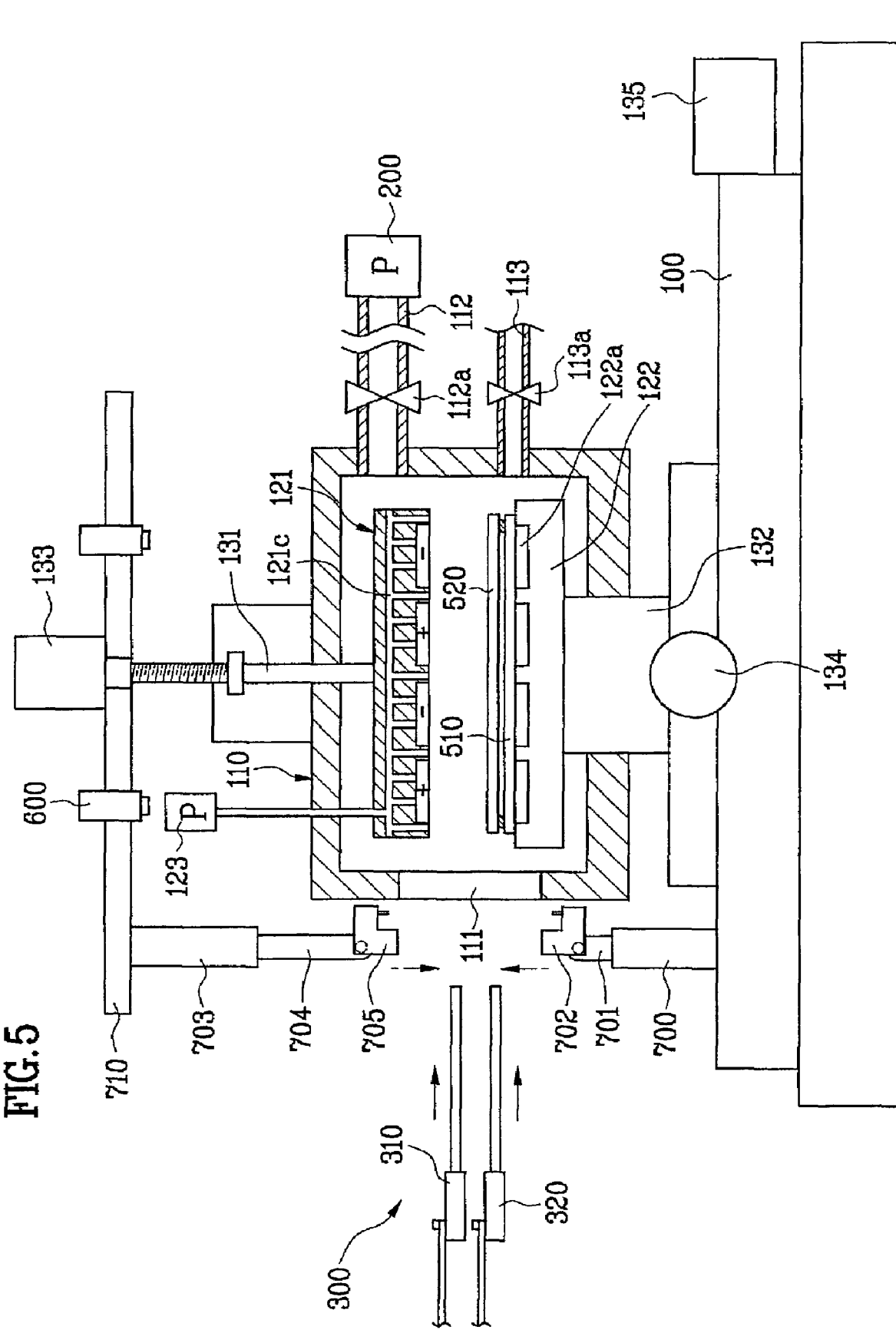
FIG. 5 is a simplified schematic diagram illustrating an ionizing device of a bonding chamber in accordance with the second embodiment of the present invention.

FIG. 5 is a simplified schematic diagram of an ionizing device of a bonding device in accordance with the second embodiment of the present invention. As shown in FIG. 5, the ionizing device is respectively formed at the upper and lower parts of the opening 111 of the bonding chamber 110. In particular, in front of the opening 111 of the bonding chamber 110, a first cylinder 700 for elevating the ionizing device is provided and preferably fixed to the base 100 of the bonding device. Also, a first elevating axis 701 is provided for vertical movement by an operation of the first cylinder 700. The first ionizing device 702 is provided on the first elevating axis 701, preferably such that it can rotate on the first elevating axis 701. In front of the opening 111 of the bonding chamber 110, a second cylinder 703, a second elevating axis 704, and a second ionizing device 705 are formed. The second cylinder 703 for elevating the ionizing device 705 is preferably fixed to an upper frame 710 of the bonding device. The second elevating axis 704 moves up and down by the operation of the second cylinder 703. The second ionizing device 705 is formed on the second elevating axis 704. Similarly, it is preferred that the second ionizing device 705 is able to rotate on the second elevating axis 704.

The second embodiment of the present invention can eliminate static electricity at the upper stage as well as the lower stage. The upper stage may have a less possibility of having the static electricity. However, if the electro static chuck (ESC) is provided in both the upper and lower stages, the stages are preferably provided with separate ionizing air and gases, by which the remaining static electricity can be eliminated more completely in the second embodiment than in the first embodiment.

The ionizing device will be described in more detail below.

Figure 6:
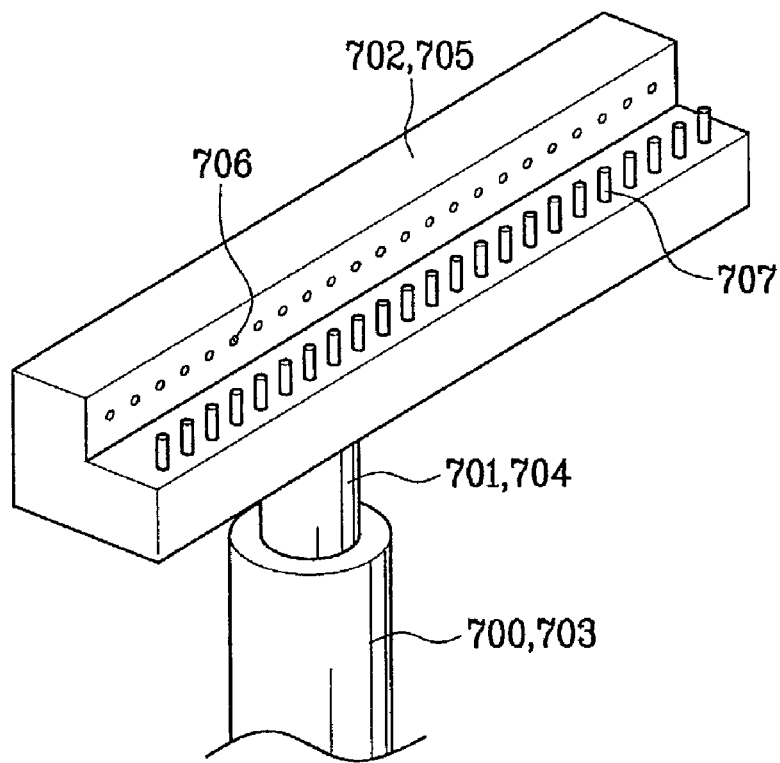
FIG. 6 is a perspective view illustrating an ionizing device in accordance with the first and second embodiments of the present invention.
Figure 7:
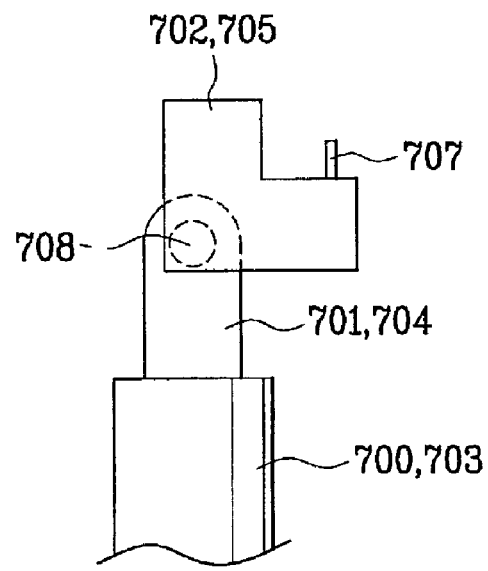
FIG. 7 is an enlarged sectional view illustrating an ionizing device in accordance with the first and second embodiments of the present invention.

FIG. 6 is a perspective view of an ionizing device in accordance with the first and second embodiments of the present invention and FIG. 7 is an enlarged sectional view of an ionizing device in accordance with the first and second embodiments of the present invention.

The first and second ionizing devices 702 and 705 have "L"-shaped pipes with lengths corresponding to the width of the respective openings 111. On their upper face, the first and second ionizing devices 702 and 705 have a single hole or a plurality of holes 706 for blowing air or $N_2$ gas. FIG. 6 shows a plurality of holes 706 corresponding to ion generating tips 707 arranged at their front. However, other suitable embodiments are contemplated such as N number of holes 706 and M number of ion generating tips, where N and M are integers greater than or equal to 1. A supply pipe 709 for providing the air or gases is connected to the pipe. The first and second elevating axes 701 and 704 and the first and second ionizing devices 702 and 705 are preferably connected by a hinge axis 708 in a rotatable way.

Also, the first and second ionizing devices 702 and 705 may be narrower than as shown in FIG. 6 with a smaller number of holes 706 and ionizing tips 707. In this instance, the ionizing devices 702 and 705 may be capable of moving not only in a rotating fashion but also in a lateral direction do cover the length of the opening 111 to ensure that ions are sufficiently introduced into the bonding chamber.

An operation of an ionizing device in accordance with the first and second embodiments of the present invention will be described.

As described above, after the first and second substrates 510 and 520 are bonded in a vacuum state, the substrates 510 and 520 are pressed together as the bonding chamber is vented. Then, the door is opened at the opening 111 to drive the cylinders 700 and 703 right before the loader 300 unloads the pressed substrates. As the cylinders are driven, the ionizing devices 702 and 705 are placed in front of the opening 111. Air or gases blow ions generated from ion generating tips 707 so that the air or gases flow into the bonding chamber 110. The ionizing devices 702 and 705 rotatably coupled to the elevating axes 701 and 704 are rotated in a predetermined angle so that the ionizing air or gases can evenly flow into the bonding chamber 110.

After a predetermined time after the ionizing air or gases flow into the bonding chamber 110, the cylinder is driven to replace the ionizing device to its original place. Then, the loader 300 unloads the bonded substrates and loads next substrates to be newly bonded into the bonding chamber 110.

When the ionized air or gases flow into the bonding chamber, the static electricity generated when the bonded substrates 510 and 520 are separated from the lower stage 122 or when the substrates are placed on the respective stages can be prevented. In particular, because the upper and lower stages bond the substrates using the electro static chucks 121a and 122a, the bonded substrates may have voltages remaining even when the voltage is turned off and not applied to the electro static chucks 121a and 122a. Accordingly, there is a high possibility that static electricity will be generated on the substrates when a lift bar (not shown) lifts the bonded substrates to allow the loader to receive the substrates. However, the static electricity by the electro static chuck is prevented in the present invention because the substrates are unloaded after the ionizing air or gases flow into the bonding chamber. In this way, the inner circuits are protected.

Alternatively, the ionizing device 700 may be formed at the opening of the bonding chamber 110. For example, the vent pipe 113 may have an ionizing device to ionize the air or gases which flow into the bonding chamber 110 through itself. The ionizing device can be formed on all the vent pipes when a plurality of vent pipes are formed.

Figure 8:
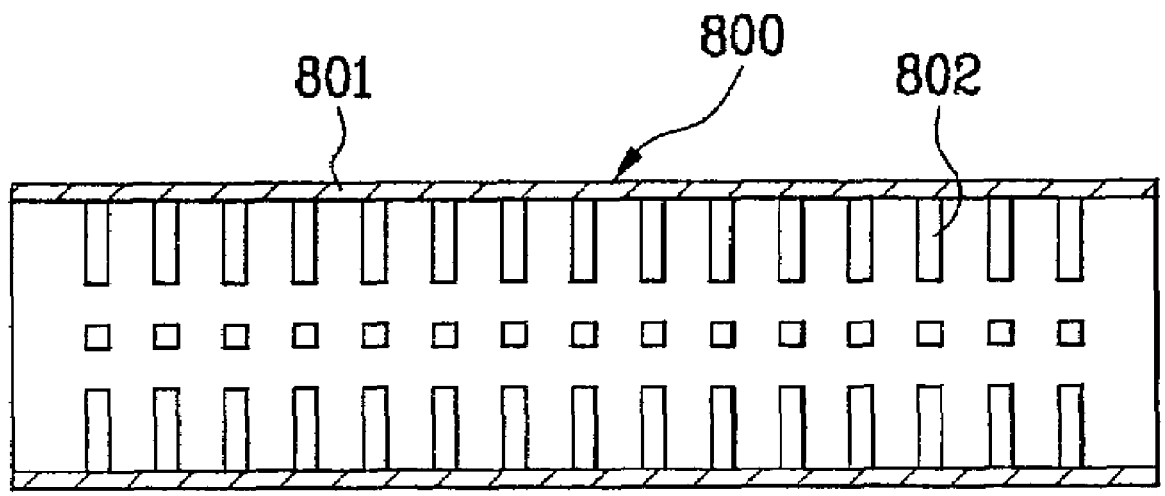
FIG. 8 is a simplified schematic diagram of an ionizing device installed on a vent pipe in accordance with the third embodiment of the present invention.

FIG. 8 is a simplified schematic diagram of an ionizing device that can be formed on a vent pipe in accordance with the third embodiment of the present invention. The ionizing device 800 of the third embodiment has a plurality of ion generating tips 802 for generating ions inside an ion generating pipe 801 similar to the vent pipe 113. That is, the vent pipe 113 itself can have ion generating tips 802. Also, the ionizing device can be installed either inside the vent pipe 113 or on a vent hole 113b connected to the vent pipe 113.

Figure 9:
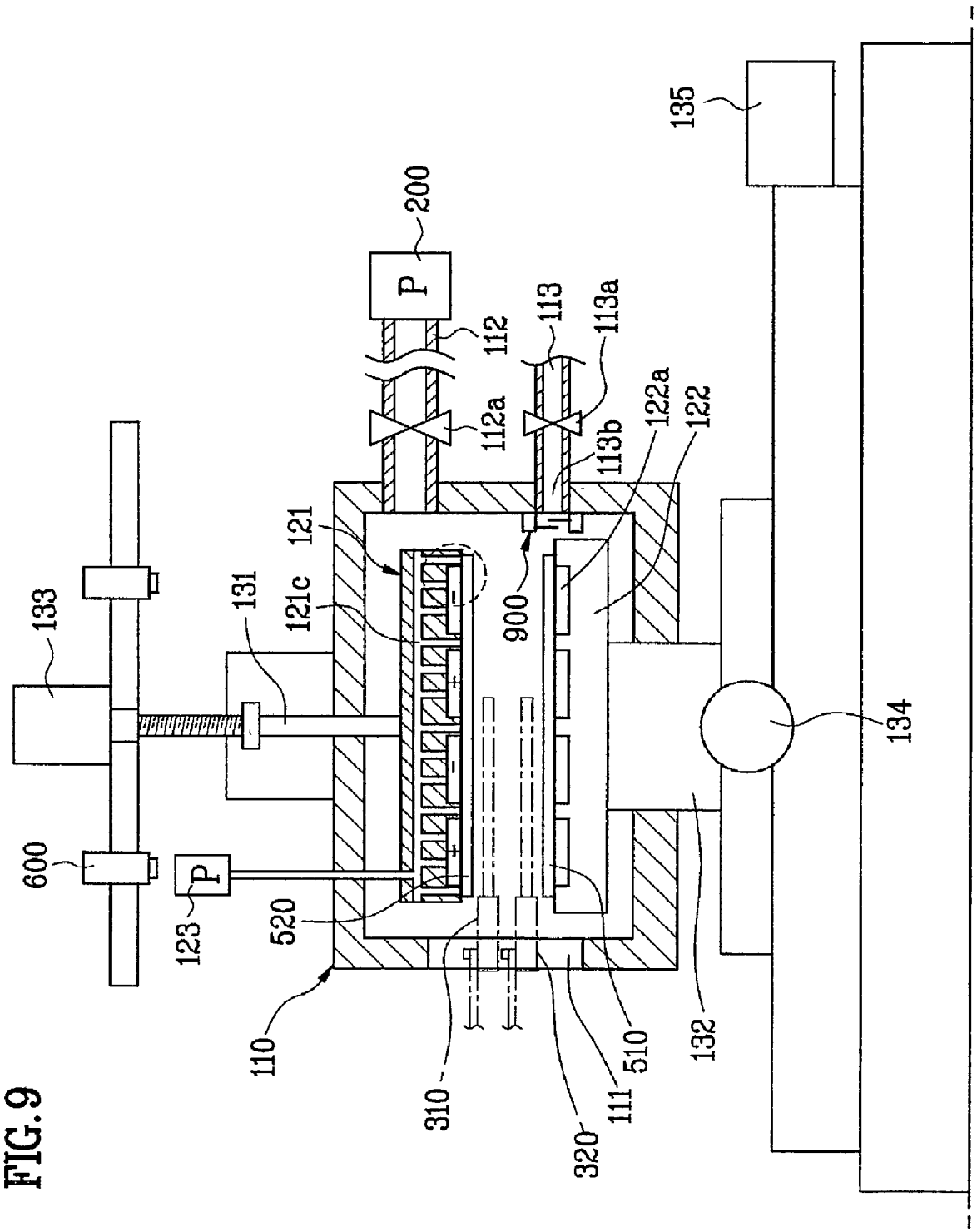
FIG. 9 is a simplified schematic diagram illustrating an ionizing device of a bonding chamber in accordance with the fourth embodiment of the present invention.
Figure 10:
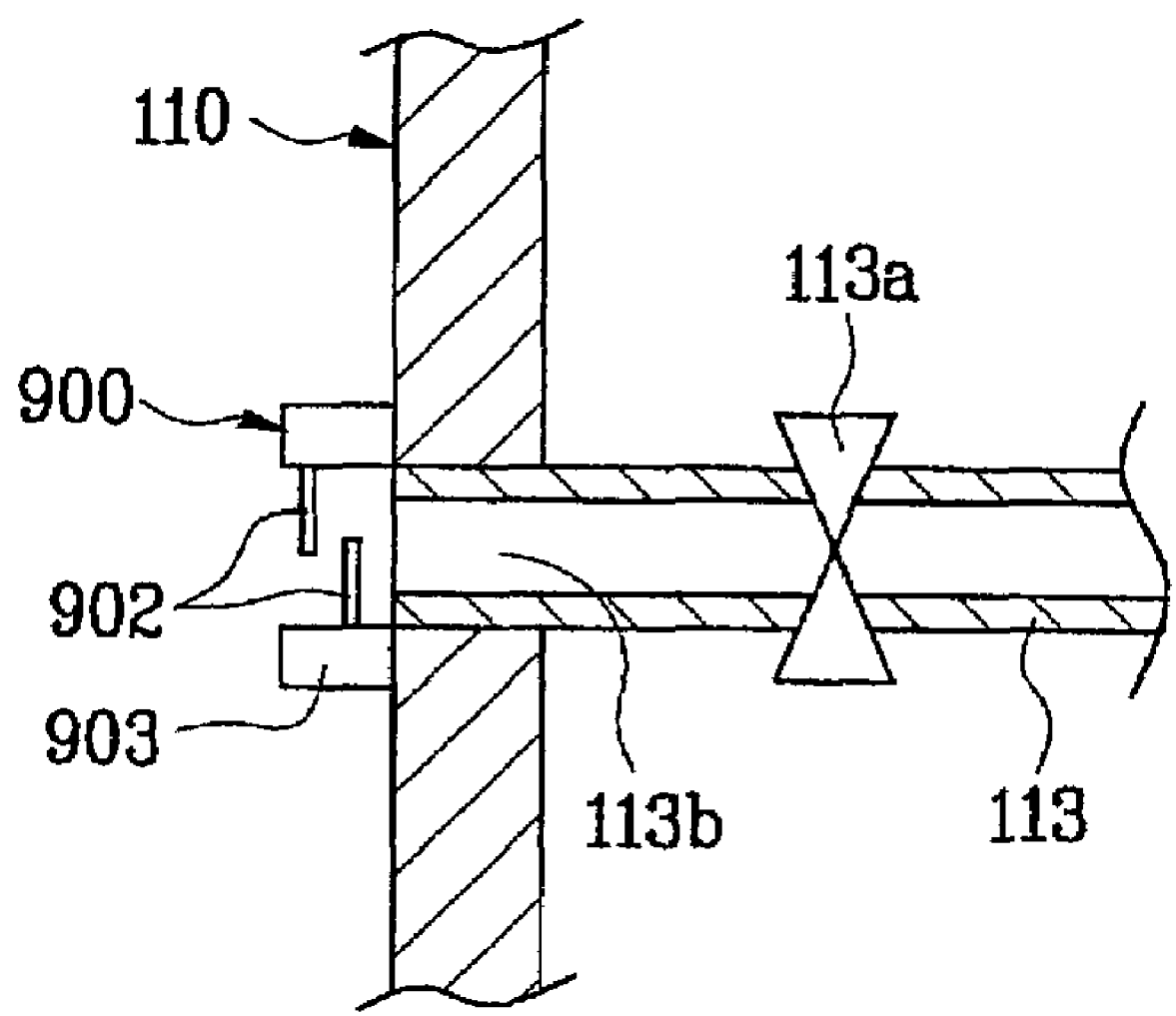
FIG. 10 is an enlarged diagram of the ionizing device of FIG. 9.

FIG. 9 is a simplified schematic diagram of an ionizing device of a bonding chamber in accordance with the fourth embodiment of the present invention and FIG. 10 is an enlarged diagram of the ionizing device of FIG. 9. The bonding device of the fourth embodiment of the present invention has the same construction as that of the third embodiment except that an ionizing device 900 is formed at a vent hole 113b connecting a vent pipe 113 with the bonding chamber 110. In other words, a support 903 is formed on an inner wall face of the bonding chamber, near the vent hole 113b. Also, a plurality of ion generating tips 902 are formed on the support 903 to ionize the air or gases which flow into bonding chamber through the vent pipe 113.

At this time, the support 903 can be formed in a rotatable way in the bonding chamber 110 so that the ionizing device 900 is rotatable. Also, a plurality of the vent holes such as four, for example, 113b may be formed. The ionizing device 900 can be formed either at all the vent holes or selectively at some of the vent holes.

An operation of an ionizing device of a bonding device in accordance with the third and fourth embodiments of the present invention will be described below.

As described above, first and second substrates 510 and 520 are loaded in the bonding chamber 110. The bonding chamber 110 bonds the second substrate 520 at an upper stage 121 to the first substrate 510 at a lower stage 122 by pressing them together.

Then, dry air or $N_2$ gas flows into the bonding chamber 110 as a vent pipe 113 is opened by a valve 113a to place the bonding chamber 110 in an atmospheric state. Accordingly, the bonded substrates are pressurized because of a pressure difference inside the bonding chamber 110. That is, because the bonding chamber is in the atmospheric state and the interval or space between the first and second substrate is in the vacuum state, a uniformly pressure is applied. The air or gases which flow into the bonding chamber 110 through the vent pipe 113 are ionized ($N_2^+$, $N_2^-$) by ions generated from ion generating tips 802 and 902 of the ionizing devices 800 and 900, and the ionized air and gases flow into the bonding chamber 110.

As the ionized air and gases flow into the bonding chamber, static electricity inside the bonding chamber is prevented. In the bonding device of the present invention, there is a high possibility of static electricity generated during the process of loading and unloading of the substrates because the substrates are held and fixed by an electro static chuck. In the bonding device of the present invention, however, an ionizing device is formed on the vent pipe 113 or at the vent hole 113b so that ionized air or gases evenly flow into the bonding chamber 110. In this way, the static electricity is prevented.

After the venting process, the door at the opening 111 of the bonding chamber is driven to open. Subsequently, the loader 300 unloads the bonded substrates and begins the processes to bond new substrates.

A bonding device and an ionizing device of the present invention have the following advantages.

First, in the present invention, the bonding device is provided as a separate device different from devices for applying a liquid crystal or applying a sealant. Also, the bonding device is provided with substrates already having the liquid crystal and sealant, unlike the related art bonding device in which the liquid crystal and sealant are dispensed at the bonding device. Accordingly, the bonding device of the present invention has much smaller size than that of the related art, thereby making it possible to efficiently design a layout and reduce footprint space.

Second, because the processes of applying the liquid crystal, applying the sealant, and bonding the substrates are performed simultaneously in a pipeline fashion in different devices, the overall process time decreases.

Third, because the lower stage moves minimally, the alignment of the substrates is performed in a fast and precise way. In particular, as the bonding chamber is formed as one integral unit, unlike the related art bonding chamber in which the chamber is divided into two parts, problems caused by leakage during the coupling of the two parts is prevented. Also, components for preventing such leakage are not required.

Fourth, the arm for bringing in the next one of the substrates such as the substrate with the sealant, brings in the next substrate before taking out the previously bonded substrates from the lower stage. Accordingly, the process time for bringing the next substrate and taking out the bonded substrates is reduced.

Fifth, even though the bonding device of the present invention uses an electro static chuck to bond the substrates, undesirable static electricity is prevented because of ionized air or gases. The ionized air or gases are blown into the bonding chamber right before the loading and unloading of the substrates. Thus, inner circuits are prevented from damage by static electricity.

Sixth, as the ionizing device is rotatably formed in front of the opening of the bonding chamber to evenly provide ionized air or gases to the bonding chamber, static electricity is more efficiently prevented.

Seventh, because the ionizing device is respectively formed on the upper and lower parts of the opening of the bonding chamber, the upper and lower stages having a high possibility of residue static electricity are protected.

Eighth, because the ionizing device is formed on a vent pipe or at a vent hole to evenly provide the ionized air or gases into the bonding chamber, static electricity preventing effect increases.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of bonding first and second substrates of a liquid crystal display device comprising:
   opening a substrate feeding opening of the bonding chamber;
   introducing first and second substrates into the bonding chamber through the substrate feeding opening;
   closing the substrate feeding opening;
   creating a vacuum within the bonding chamber after closing the substrate feeding opening;
   bonding the first and second substrates together within the vacuum of the bonding chamber; and
   introducing ions into the bonding chamber after creating the vacuum using an ion generator, wherein the ion generator is moved to the substrate feeding opening in the bonding chamber before introducing ions.

2. The method of claim 1, wherein the ions are introduced into the bonding chamber through an ion opening in the bonding chamber.

3. A method of bonding first and second substrates of a liquid crystal display device comprising:
   opening an opening of the bonding chamber;
   introducing first and second substrates into the bonding chamber through the opening;
   closing the opening;
   creating a vacuum within the bonding chamber after closing the opening;
   bonding the first and second substrates together within the vacuum of the bonding chamber; and
   introducing ions into the bonding chamber,
   wherein the ions are introduced into the bonding chamber through a vent pipe coupled to the bonding chamber for breaking the vacuum in the bonding chamber to place the bonding chamber at atmospheric pressure.

4. A method of bonding first and second substrates of a liquid crystal display device comprising:
   opening a substrate introduction opening of the bonding chamber;
   introducing first and second substrates into the bonding chamber through the substrate introduction opening;
   closing the substrate introduction opening;
   creating a vacuum within the bonding chamber after closing the substrate introduction opening;
   bonding the first and second substrates together within the vacuum of the bonding chamber; and
   introducing ions into the bonding chamber after creating the vacuum,
   wherein the ions are generated at an interior wall surface of the bonding chamber adjacent a vent hole in the interior wall surface for breaking the vacuum in the bonding chamber to place the bonding chamber at atmospheric pressure.

5. The method of claim 1, further comprising:
   after the bonding, pressing the bonded first and second substrates together;
   after pressing the first and second substrates together, opening the opening; and
   removing the pressed, bonded first and second substrates through the opening.

6. A method of bonding first and second substrates of a liquid crystal display device comprising:
   opening an opening of the bonding chamber;
   introducing first and second substrates into the bonding chamber through the opening;
   closing the opening;
   creating a vacuum within the bonding chamber after closing the opening;
   bonding the first and second substrates together within the vacuum of the bonding chamber; and
   introducing ions into the bonding chamber after creating the vacuum;
   after the bonding, pressing the bonded first and second substrates together; and removing the pressed, bonded first and second substrates,
wherein the ions are introduced simultaneously with the pressing, and wherein the ions are generated using a vent pipe coupled to the bonding chamber for breaking the vacuum in the bonding chamber to place the bonding chamber at atmospheric pressure, and wherein the vent pipe includes ion generating electrodes arranged along a length of the vent pipe that ionize a gas flowing through the vent pipe.

7. The method of claim 5, wherein the ions are introduced after the pressing.

8. The method of claim 7, wherein the ions are introduced before the removing.

9. The method of claim 7, wherein the ions are introduced through the substrate feeding opening.

* * * * *